United States Patent [19]

Dobbs, Jr.

[11] Patent Number: 4,953,301

[45] Date of Patent: Sep. 4, 1990

[54] REPLACEABLE SAW BLADE AND GUIDE

[76] Inventor: Howard L. Dobbs, Jr., R.R. #5, Box 173-A, Emporia, Kans. 66801

[21] Appl. No.: 456,510

[22] Filed: Dec. 26, 1989

[51] Int. Cl.$^5$ .................. B27B 11/02; B27B 33/02
[52] U.S. Cl. .................................... 30/392; 30/394; 83/835
[58] Field of Search .................. 30/392, 394; 83/835, 83/854

[56] References Cited

U.S. PATENT DOCUMENTS

| | | |
|---|---|---|
| 964,669 | 7/1910 | May et al. . |
| 1,364,054 | 12/1920 | Adams . |
| 1,838,125 | 12/1931 | Wirtz .................................... 30/394 |
| 2,327,167 | 8/1943 | Bratek et al. . |
| 2,784,751 | 3/1957 | Alexander .......................... 30/394 |
| 2,895,514 | 7/1959 | Wright .................................. 30/394 |
| 3,155,128 | 11/1964 | Godfrey et al. . |
| 3,270,369 | 9/1966 | Mandell . |
| 3,537,490 | 11/1970 | Shaw . |
| 3,716,916 | 2/1973 | Alexander ............................ 30/392 |
| 4,675,944 | 6/1987 | Wells ..................................... 17/23 |

OTHER PUBLICATIONS

Jarvis Brochure, Part List.

Primary Examiner—Frank T. Yost
Assistant Examiner—John M. Husar
Attorney, Agent, or Firm—Hovey, Williams, Timmons & Collins

[57] ABSTRACT

An improved saw blade assembly (22) for use with heavy duty reciprocating power saws (10) is provided which includes a stationary, slotted blade support (24), as well as a reciprocable, U-shaped in cross-section blade (26) equipped with a crosspin (50) adapted for sliding receipt within said plate slot (38). The blade includes flanges (46,48) preferably extending essentially the full length of the cutting surface (42) of the blade (24), and moreover are of a height to provide substantial lateral support, thereby minimizing the occurrence of plate breakage during rugged use, e.g., in bone cutting operations.

3 Claims, 1 Drawing Sheet

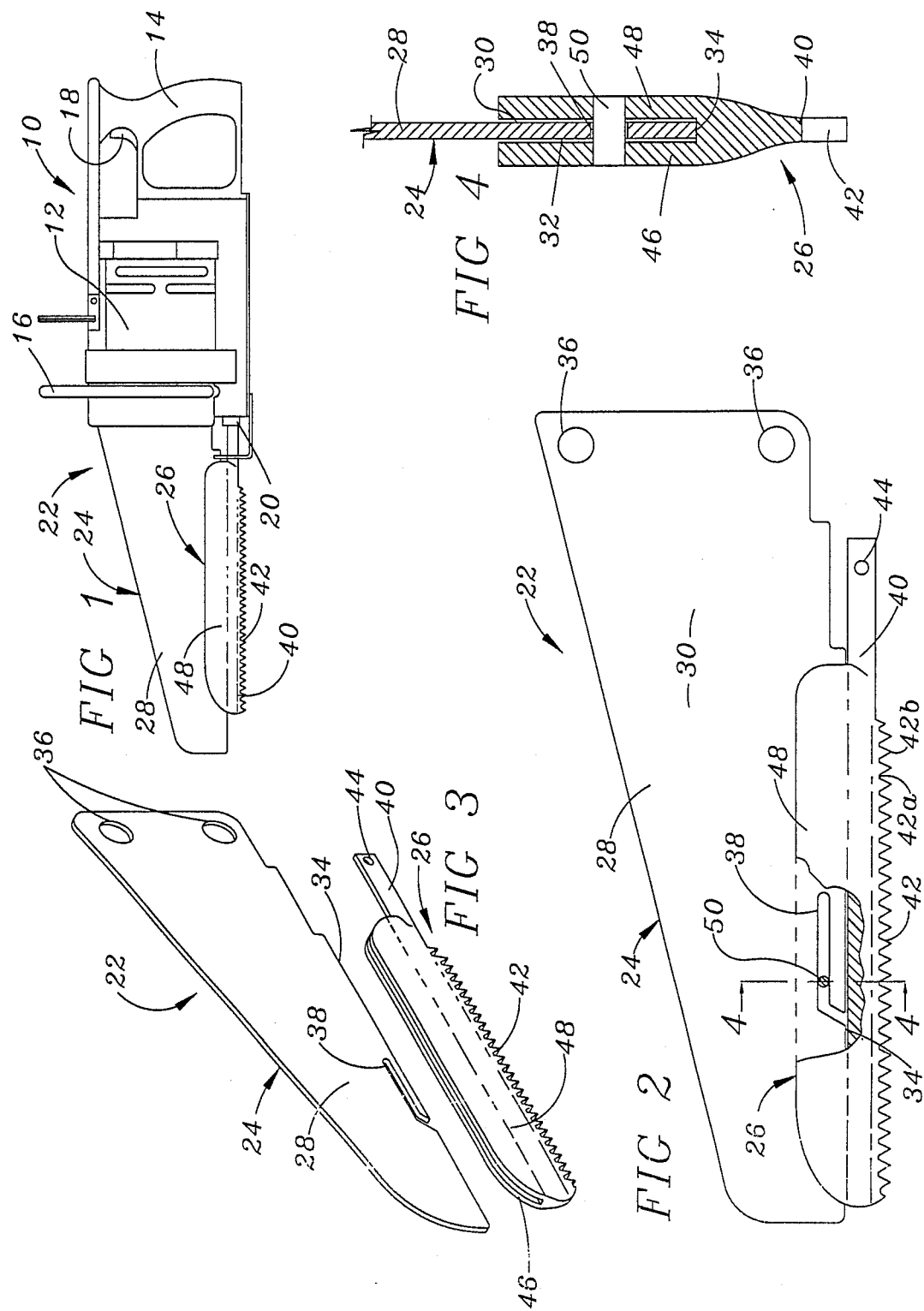

4,953,301

REPLACEABLE SAW BLADE AND GUIDE

BACKGROUND OF THE INVENTION

1. Field of the Invention

The present invention is broadly concerned with an improved saw blade assembly of the type adapted for use with industrial, heavy duty, reciprocating power handsaws commonly used in slaughterhouses. More particularly, it is concerned with such a blade assembly which overcomes the chronic problem of blade support breakage encountered during use of such power saws for the cutting of bones and other hard material.

2. Description of the Prior Art

Those involved in the meat packing industry often make use of heavy duty portable handsaws of the reciprocating variety. For example, in the cutting of meat carcasses, it is necessary to sever large amounts of bone, and saws of the type described have long been used in this context. One specific type of saw in wide spread use in the meat packing industry is commercialized by Jarvis Products Corporation of Middletown, Conn., as its "Wellsaw Model 444" power saw.

Saws of the described type employ saw assemblies including a stationary, metallic, elongated support, together with a replaceable blade presenting a lower cutting surface, usually of the sawtooth variety. The blades are secured to the supports adjacent the lower margin of the latter, through provision of a small slot in the support and a cooperating detent carried by a blade tab. In addition, the prior blade supports are constructed so that the lowermost blade-receiving margin thereof is thinner than the main body of the support. In practice, use of blade assemblies of this type leads to excessive breakage of the blade supports, at the region of the guide slot. Such breakage problems are particularly acute when the saws are used to cut carcass bones, given the need to impart twisting movements to the blade and support while encountering such hard conditions as bone cutting. Indeed, breakage of these blade supports represents a significant cost factor in the meat packing operation.

SUMMARY OF THE INVENTION

The present invention overcomes the problems outlined above, and provides an improved blade assembly specifically adapted for the rugged conditions such as cutting wood, metal, plastic and other materials encountered in meat packing plants and for other applications. Broadly speaking, the assemblies of the invention include an elongated, planar metallic blade support adapted to be coupled to a conventional saw housing, together with a cooperating, U-shaped in cross-section, reciprocable blade. The blade support is provided with an elongated guide slot, and is preferably of uniform thickness throughout its length and width, particularly at the lower blade-receiving margin thereof.

The blade, on the other hand, includes the usual lowermost cutting surface, but is improved by provision of a pair of relatively large, upwardly extending flanges which, when the blade is attached to the support, extend a substantial distance above the lower margin of the support. Additionally, the blade is provided with a crosspin extending between the flanges, with the pin being oriented for receipt and sliding movement within the support slot.

BRIEF DESCRIPTION OF THE DRAWING

FIG. 1 is a side elevational view of a reciprocating power handsaw, equipped with the blade assembly of the present invention;

FIG. 2 is a side view with parts broken away for clarity of the preferred blade assembly;

FIG. 3 is an exploded view illustrating the construction of the blade assembly parts; and FIG. 4 is a sectional view taking along line 4—4 of FIG. 2.

DESCRIPTION OF THE PREFERRED EMBODIMENT

Turning now to the drawing, a reciprocating saw 10 is illustrated in FIG. 1. The saw 10 includes the usual motor housing 12, rear handle 14, upper handle 16, and trigger switch 18. In addition, the saw housing is provided with means (not shown) for attachment of a stationary blade support thereto, as well as a connector 20 for coupling a reciprocable saw blade to the internal motor of the saw.

The saw 10, as depicted, is equipped with a saw blade assembly referred to by the numeral 22. Assembly 22 in turn comprises a metallic blade support 24 as well as a replaceable cutting blade 26. In the preferred embodiment, assembly 22 is configured for use with the Jarvis "Wellsaw Model 444" but as those skilled in the art will appreciate, assembly 22 can be modified for use with any reciprocal drive unit.

Blade support 24 is somewhat triangular in configuration and presents a main body portion 28 having a pair of opposed side surfaces 30,32, as well as a lowermost, fore-and-aft extending blade-engaging margin 34. The rearward end of the support 24 is provided with a pair of connection apertures 36 permitting the support to be securely and rigidly connected to the saw housing. As best seen in FIGS. 2 and 3, the support 24 also is equipped with a guide slot 38 extending from margin 34 and rearwardly along the length of the latter.

In practice, the blade support 24 is advantageously formed of stainless steel (308) for packing house use, but may be formed of carbon steel for use in other contexts. As depicted in FIG. 4, the support is of substantially the same thickness throughout the length and width thereof, with no reduction in thickness at the margin 34.

Blade 26 includes an elongated segment 40 presenting a lowermost, sawtooth cutting edge 42 as well as a rearmost connection aperture 44 adapted for coupling to the connector 20 of the saw. In addition, the overall blade includes a pair of upwardly extending metallic support flanges 46,48 which are secured to segment 40 by welding or other appropriate means. A crosspin 50 extends between and is connected to the flanges 46,48 above segment 40, and is sized for sliding reception within slot 38.

In order to provide the most advantageous blade assembly, the blade 26 is designed with certain preferred structural and dimensional relationships. For example, it will be seen that the flanges 46,48 extend essentially the full length of cutting surface 42 (in fact, in the depicted embodiment, the flanges extend a distance greater than the length of the surface 42). At a minimum, the flanges 46,48 should extend a distance at least equal to fifty percent of the length of cutting surface 42. Furthermore, the vertical height of the the flanges 46,48 is such as to embrace a substantial portion of the main body 28 of support 24. In particular, it is advantageous to provide flanges 46,48, which have a height at least four times the average tooth height of the saw teeth of surface 42 (i.e., the average of the distances between the valleys 42a and peaks 42b thereof). The placement of pin 50 is also of significance, in that it is located well above the body 40 and particularly connection aperture 44, which is coincident with the axis of reciprocation of the blade. Preferably, the flanges 46,48 should be arranged so that the clearance between the flanges and the adjacent surfaces of the support 24 are from about five to twenty thousandths of an inch.

By virtue of the described construction, the blade assemblies of the present invention have been found to be significantly more resistant to breakage during bone cutting operations. These beneficial results are believed to stem from the factors mentioned above, particularly the provision of flanges 46,48 extending the entire length of the cutting surface 42, as well as the relative height of the flanges.

I claim:

1. A blade assembly adapted for connection to a reciprocating saw having a housing and means for reciprocating a cutting blade, said assembly comprising:

an elongated, planar support plate adapted for securement to said housing and presenting a main body portion, a lowermost, elongated, fore-and-aft extending bladeengaging margin, and structure defining an elongated slot extending from said margin and along the length of the support the thickness of said blade-engaging margin being essentially equal to or greater than the thickness of said main body portion; and an elongated, reciprocable cutting blade adapted for connection to said saw reciprocating means and presenting an elongated, lowermost cutting surface, a pair of upwardly extending, laterally spaced apart flanges each extending a fore-and-aft distance which is at least about 50% of the length of said lowermost cutting surface and each terminating at the lower end thereof at a point above said lowermost cutting surface, and a crosspiece extending laterally between and coupled to said flanges, said blade being operably coupled with said support blade with said crosspiece slidably received in said slot and with said flanges extending upwardly from said plate lower margin a substantial distance in closely adjacent relationship with the opposed faces of said main body portion, said crosspiece being disposed below the upper margins of said flanges.

2. The assembly of claim 1, said support plate having essentially the same thickness throughout the length and width thereof.

3. The assembly of claim 1, said cutting surface presenting a sawtooth configuration with an average tooth height distance between the peaks and valleys of said sawtooth surface, said flanges having a vertical height at least about four times greater than said average tooth height distance.

* * * * *